Patented Feb. 5, 1952

2,584,150

UNITED STATES PATENT OFFICE 2,584,150

PREPARATION OF NUTLIKE PRODUCTS FROM DRY BEANS

Herman J. Morris, Berkeley, Calif., assignor to the United States of America as represented by the Secretary of Agriculture No Drawing. Application July 29, 1949,
Serial No. 107,626

3 Claims. (Cl. 99—98)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to me of any royalty thereon.

This invention relates to the processing of dry beans of the species Phaseolus vulgaris. In particular it relates to the preparation of nut-like products from such dry beans.

It has been found that if dry beans of the species Phaseolus vulgaris are subjected to a particular sequence of steps, as hereinafter described, the beans are converted into products of novel properties and flavor. In appearance the products resemble nuts as they retain the distinctive "bean" shape; they are crisp yet tender and have a distinctive nutty flavor. When made from white varieties, the color of the product is a glossy tan to light brown. Darker varieties of beans yield generally brown products.

The raw materials for the process may be any of the commercially available dry beans of the species Phaseolus vulgaris sold for household or canning purposes. Suitable varieties are the Michelite (or small Navy bean), Great Northern, Red Mexican, Pinto, and so forth.

The novel products of this invention are produced as follows: The dry beans are first soaked in water. The purpose of this treatment is to plump the beans by their imbibition of water. Generally, this end is readily attained by placing the dry beans in a vessel, covering them with water and allowing them to soak until they are plump. Generally the soaking is continued until the beans have imbibed sufficient water to double approximately their weight. This result is generally achieved by soaking for a period from about 3 hours to about 16 hours, depending upon the variety of bean. Most beans imbibe water rapidly for the first 3 to 5 hours and then the rate of imbibition slows down considerably. The proper time for soaking can be easily ascertained by soaking small quantities of the beans for varying lengths of time and weighing the various samples to note the time of soaking which causes approximate doubling in weight. Some lots do not plump properly on soaking as they contain a large percentage of "hard-shells," i. e., beans which do not imbibe water at the usual rate but remain hard. In treating lots of this type it is preferable to give the entire lot of beans a blanching treatment in boiling water or steam for a short period of time, say, ½ to 1 minute, whereby the entire lot of beans will plump properly. This blanching treatment is also advantageous as it destroys much of the microbial population of the beans and thus decreases possibility of souring during the soaking operation.

After the beans have been soaked they are subjected to a partial cooking operation. This is accomplished by heating the plumped beans while in contact with water. This cooking operation can be performed at atmospheric pressure or at superatmospheric pressure in a retort or autoclave. The time and temperature of cooking should be controlled so that the skins are not ruptured. The aim is to tenderize the skin and endosperm but not to completely cook them. For example in cooking at atmospheric pressure (212° F.) a cooking of about 10 minutes is required; at 5 lbs./sq. in. pressure (226° F.) a time of about 1 to 2 minutes is required; at 10 lbs./sq.in. pressure (240° F.) only about 5–15 seconds are required.

The partially cooked beans are drained and then fried in oil. In this treatment the water content of the beans is largely expelled, the beans absorb oil and the products are further cooked to an edible degree. Also during this operation, some caramelization occurs. Thus when white beans are used the cooked beans are a cream color and upon frying become golden in color. In this frying step the temperature of the fat should be from about 300° to about 360° F. The time of frying is inversely related to the temperature so that whereas at 300°, the frying time may be as long as 30 minutes, at 360°, the frying time may be as short as 2 minutes. It is generally preferred to fry at 330° for about 3 minutes. In general it is best to discontinue the frying as soon as the "boiling," which is caused by expelling of steam from the beans, subsides. In this frying operation, one may use any edible glyceride oil, for example, corn oil, sesame oil, peanut oil, cottonseed oil, soybean oil, olive oil, lard, hydrogenated vegetable oils, and so forth.

After frying, the beans are edible but soft and soggy. In order to make them crisp and give them a nut-like color, texture and flavor they are roasted. To this end they are placed in trays in an oven and heated at a temperature from about 320° to about 390° F. The time of roasting depends on the degree of brownness and crispness desired. Suitable times are 8 minutes at 390° or 20 minutes at 320.° If it is desired to reduce the oil content of the products, the fried beans are placed on sheets of absorbent paper and then roasted. The paper then absorbs the excess oil which exudes from the beans during the roasting operation. The roasted beans are then salted; the salt may contain some monosodium glutamate to enhance the flavor of the product.

The following examples describe particular steps, materials, and conditions within the scope of this invention, but it is to be understood that these examples are given only by way of illustration and not limitation.

Example I 2 kg. of Great Northern dry beans were blanched in boiling water for one minute, cooled, then placed in water and allowed to soak at 25° C. for 16 hours. The soaked beans were then placed in a pressure cooker containing water and cooked at 5 lbs./sq. in. pressure for one minute. The partially cooked beans were then drained, and fried in sesame oil for 3 minutes at 160° C. (320° F.). The fried beans were then placed on trays lined with paper towels and the trays placed in an oven where the beans were roasted for 15 minutes at 175° C. (347° F.). The yield was 2200 g. The products had a golden-brown color and a glossy appearance; their texture was crisp and they could be easily crushed between the thumb and index finger. They had a very pleasing nut-like flavor. Samples of the product were placed in cellophane bags and sealed, then stored at room temperature. It was noted that after storage for 5 months the products still had an excellent flavor.

Example II

A lot of Great Northern beans were washed, blanched for one minute with steam at 100° C., cooled, then soaked for 16 hours in water. The soaked beans were then placed in a retort together with water and heated until the pressure rose to 10 lbs./sq. in. The pressure was maintained about 10 seconds then the products were removed and separated into three lots. Each lot was then fried in oil for 3 minutes at 160° C. (320° F.). In each case a different oil was used, namely, edible grades of corn oil, peanut oil, and cottonseed oil, respectively. The fried beans were then roasted in an oven for 11 minutes at 170° C. (338° F.) until golden-yellow in color. The products were glossy, crisp and easily crushed with the fingers and had a very pleasing nut-like flavor. The three different lots were subjected to a taste appraisal panel and the three lots were adjudged to be indistinguishable in flavor and texture.

Having thus described the invention, what is claimed is:

1. Process for preparing nut-like products from dry beans of the species *Phaseolus vulgaris* which comprises the steps of soaking the beans in water, partially cooking the soaked beans in water, frying the partially cooked beans in oil, then roasting the fried beans until a product of the desired degree of color and crispness is produced.

2. Process for preparing nut-like products from dry beans of the species *Phaseolus vulgaris* which comprises the steps of soaking the dry beans in water until they have approximately doubled their weight, partially cooking the soaked beans in water, frying the partially cooked beans in oil until their water content is largely expelled, and then roasting the fried beans until a crisp, nutty-flavored, golden-brown product is produced.

3. Process for preparing nut-like products from dry beans of the species *Phaseolus vulgaris* which comprises the steps of soaking the dry beans in water until they have approximately doubled their weight, cooking the soaked beans to tenderize them, frying the tenderized beans in oil at a temperature from about 300° F. to about 360° F. until their water content is largely expelled, and then roasting the fried beans at a temperature of about 320° F. to about 390° F. until a crisp, nutty-flavored, golden-brown product is produced.

HERMAN J. MORRIS.

REFERENCES CITED

The following references are of record in the file of this patent:

UNITED STATES PATENTS

| Number | Name | Date |
| --- | --- | --- |
| 1,774,110 | Sloat | Aug. 26, 1930 |
| 2,135,593 | Nohe | Nov. 8, 1938 |
| 2,316,458 | Scalise | Apr. 13, 1943 |